United States Patent
Mizuguchi

(10) Patent No.: US 12,061,751 B2
(45) Date of Patent: Aug. 13, 2024

(54) INFORMATION PROCESSING SYSTEM, NON-TRANSITORY COMPUTER-READABLE STORAGE MEDIUM HAVING STORED THEREIN INFORMATION PROCESSING PROGRAM, AND INFORMATION PROCESSING METHOD

(71) Applicant: Nintendo Co., Ltd., Kyoto (JP)

(72) Inventor: Yuki Mizuguchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 18/295,005

(22) Filed: Apr. 3, 2023

(65) Prior Publication Data

US 2023/0244326 A1  Aug. 3, 2023

Related U.S. Application Data

(63) Continuation of application No. PCT/JP2020/038593, filed on Oct. 13, 2020.

(51) Int. Cl.
*G06F 3/0338* (2013.01)
*G06F 3/0346* (2013.01)
*G06F 3/0362* (2013.01)

(52) U.S. Cl.
CPC .......... *G06F 3/0338* (2013.01); *G06F 3/0346* (2013.01); *G06F 3/0362* (2013.01)

(58) Field of Classification Search
CPC .... G06F 3/0338; G06F 3/0346; G06F 3/0362; G06F 3/011; G06F 3/0487; A63F 13/21; A63F 13/42; A63F 13/5255
See application file for complete search history.

(56) References Cited

U.S. PATENT DOCUMENTS

| | | | | |
|---|---|---|---|---|
| 6,171,191 | B1 * | 1/2001 | Ogata | A63F 13/42 345/161 |
| 8,345,004 | B1 * | 1/2013 | Kass | G06F 3/0338 345/184 |
| 2003/0094354 | A1 * | 5/2003 | Badarneh | G06F 3/0362 200/18 |

(Continued)

FOREIGN PATENT DOCUMENTS

| JP | 2003-504818 | 2/2003 |
|---|---|---|
| JP | 2004-184127 | 7/2004 |

(Continued)

OTHER PUBLICATIONS

International Search Report for PCT/JP2020/038593 dated Dec. 28, 2020, 6 pages.

*Primary Examiner* — Christopher E Leiby

(74) *Attorney, Agent, or Firm* — Nixon & Vanderhye PC

(57) ABSTRACT

An example of an information processing system determines a shear parameter including shear direction components in at least two directions and a moment parameter including moment direction components with respect to at least two axes, the shear parameter and the moment parameter relating to a user operation on an operation handler. Then, the example of the information processing system, based on a first input that is one of the shear parameter and the moment parameter, executes first control, and based on a second input that is the other of the shear parameter and the moment parameter, executes second control.

23 Claims, 8 Drawing Sheets

(56) References Cited

U.S. PATENT DOCUMENTS

| | | | |
|---|---|---|---|
| 2004/0046735 A1* | 3/2004 | Gombert | G06F 3/038 |
| | | | 345/156 |
| 2004/0233159 A1* | 11/2004 | Badarneh | G06F 3/0338 |
| | | | 345/156 |
| 2005/0172711 A1 | 8/2005 | Gombert | |
| 2006/0255683 A1* | 11/2006 | Suzuki | G06F 3/0362 |
| | | | 310/317 |
| 2013/0027299 A1 | 1/2013 | Tsukahara et al. | |
| 2017/0090572 A1* | 3/2017 | Holenarsipur | G06F 3/0362 |
| 2017/0092446 A1* | 3/2017 | Schmitz | H01H 25/002 |
| 2018/0104584 A1* | 4/2018 | Utsugi | A63F 13/573 |
| 2019/0126136 A1 | 5/2019 | Minamino et al. | |
| 2019/0302903 A1 | 10/2019 | Atlas et al. | |
| 2019/0373096 A1* | 12/2019 | Shim | G06F 1/1626 |
| 2020/0155929 A1* | 5/2020 | Chan | H01H 15/24 |
| 2021/0268370 A1* | 9/2021 | Doucet | G06F 3/16 |
| 2023/0168750 A1* | 6/2023 | Tekerlek | G06F 3/03548 |
| | | | 345/161 |

FOREIGN PATENT DOCUMENTS

| | | |
|---|---|---|
| JP | 2013-25666 | 2/2013 |
| JP | 2014-52664 | 3/2014 |
| JP | 2014-526741 | 10/2014 |
| JP | 2017-16706 | 1/2017 |
| JP | 2019-84338 | 6/2019 |
| JP | 2020-61629 | 4/2020 |
| WO | 01/03055 | 1/2001 |
| WO | 2012/086601 | 6/2012 |
| WO | 2013/036870 | 3/2013 |

\* cited by examiner

| MOMENT | MOVING VELOCITY | RELATIONSHIP BETWEEN MOVING DIRECTION AND MOMENT DIRECTION | ACTION |
|---|---|---|---|
| LESS THAN THRESHOLD | — | — | — |
| GREATER THAN OR EQUAL TO THRESHOLD | LOW | SAME | FORWARD ROLL |
| | | OPPOSITE | BACKWARD ROLL |
| | | PERPENDICULAR | CARTWHEEL |
| | HIGH | SAME | FORWARD ROLL JUMP |
| | | OPPOSITE | BACKWARD ROLL JUMP |
| | | PERPENDICULAR | CARTWHEEL JUMP |

INFORMATION PROCESSING SYSTEM, NON-TRANSITORY COMPUTER-READABLE STORAGE MEDIUM HAVING STORED THEREIN INFORMATION PROCESSING PROGRAM, AND INFORMATION PROCESSING METHOD

CROSS REFERENCE TO RELATED APPLICATION

This application is a continuation of International Patent Application No. PCT/JP2020/038593 filed on Oct. 13, 2020, the entire contents of which are incorporated herein by reference.

FIELD

An exemplary embodiment relates to an information processing system including an operation handler for detecting shear and a moment.

BACKGROUND AND SUMMARY

Conventionally, various operation handlers are known as an operation handler for an information processing apparatus. For example, as an operation handler for an information processing apparatus, there are a control pad and a pointing stick. The control pad is an input device that includes a disc-shaped protruding portion and senses the direction in which the protruding portion moves from a reference position. On the other hand, the pointing stick is an input device that includes a rod-like protruding portion and senses the direction in which the protruding portion is tilted.

In a conventional input device, there is room for diversifying inputs via a single operation handler. Additionally, there is room for improving an application process using diversified inputs.

In view of such circumstances, it is an object of an exemplary embodiment to diversify inputs via a single operation handler or improve an application process using diversified inputs.

To solve the above issue, an information processing system according to an exemplary embodiment is an information processing system including a controller and one or more processors, the controller including: an operation handler that is operated by a finger of a user; and one or more sensors that detect a user operation on the operation handler, wherein the one or more processors: based on output from the one or more sensors, determine a shear parameter including shear direction components in at least two directions and a moment parameter including moment direction components with respect to at least two axes, the shear parameter and the moment parameter relating to the user operation on the operation handler; and based on a first input that is one of the shear parameter and the moment parameter, execute first control that is control of a movement or an orientation of an operation object in a virtual space operated by the user, and based on a second input that is the other of the shear parameter and the moment parameter, execute second control that is control different from the control of either the movement or the orientation of the operation object.

The second control may be control for causing the operation object to execute a predetermined action.

The second control may be control of a movement or an orientation of a virtual camera relating to a first-person viewpoint or a third-person viewpoint of the operation object.

One of the first control and the second control may be stepwise control according to an input amount of one of the first input and the second input, the other control may be stepwise control according to an input amount of the other input, and one of the first control and the second control may have steps finer than the other.

An input amount of one of the first input and the second input required to execute one of the first control and the second control may be greater than the other input amount required to execute the other control.

When one of the first control and the second control is executed based on one of the first input and the second input, the other input amount required to execute the other control may be greater than when both types of control are not executed.

When one of the first control and the second control is executed, the other control may not be executed.

When one of the first input and the second input is provided, an input amount required to execute control based on the other input may be greater than an input amount required to execute control based on the other input when the one input is not provided.

In a case where the second control is executed based on the second input when the first input is provided, the second control of a different type may be executed based on the first input.

The second control may be control for causing the operation object to execute a predetermined action, and actions of different types may be executed based on the first input and a direction of the second input.

The second control may be control for causing the operation object to execute a predetermined action, and actions in different directions may be executed based on the first input and a direction of the second input.

The one or more processors may switch an operation mode between a first operation mode for executing both the first control and the second control, and a second operation mode for executing one of the first control and the second control.

In the second operation mode, the first control or the second control may be executed based on an input amount of the first input and an input amount of the second input.

The controller may further include: another operation handler that is operated by a finger different from the finger of the user; and another sensor that detects a user operation on the other operation handler, wherein the one or more processors: based on output from the other sensor, may determine another shear parameter including shear direction components in at least two directions and another moment parameter including moment direction components with respect to at least two axes, the other shear parameter and the other moment parameter relating to the user operation on the other operation handler; and in the second operation mode, in a case where the movement or the orientation of the operation object is controlled based on the shear parameter, may execute control different from the control of the movement or the orientation of the operation object based on the other moment parameter, and in a case where control different from the control of the movement or the orientation of the operation object is executed based on the moment parameter, may control the movement or the orientation of the operation object based on the other shear parameter.

The information processing system may further include another controller including: another operation handler that is operated by a finger different from the finger of the user; and another sensor that detects a user operation on the other operation handler, wherein the one or more processors:

based on output from the other sensor, may determine another shear parameter including shear direction components in at least two directions and another moment parameter including moment direction components with respect to at least two axes, the other shear parameter and the other moment parameter relating to the user operation on the other operation handler; and in the second operation mode, in a case where the movement or the orientation of the operation object is controlled based on the shear parameter, may execute control different from the control of the movement or the orientation of the operation object based on the other moment parameter, and in a case where control different from the control of the movement or the orientation of the operation object is executed based on the moment parameter, may control the movement or the orientation of the operation object based on the other shear parameter.

The shear parameter and the moment parameter may be parameters relating to a displacement of the operation handler or a force applied to the operation handler by the user.

An information processing system according to an exemplary embodiment is an information processing system including a controller and one or more processors, the controller including: an operation handler that is operated by a finger of a user; and one or more sensors that detect a user operation on the operation handler, wherein the one or more processors: based on output from the one or more sensors, determine a shear parameter including shear direction components in at least two directions and a moment parameter including moment direction components with respect to at least two axes, the shear parameter and the moment parameter relating to the user operation on the operation handler; based on a first input that is one of the shear parameter and the moment parameter, execute first control, and based on a second input that is the other of the shear parameter and the moment parameter, execute second control; and in accordance with the first input or the first control executed based on the first input, determine a type of the second control or execution of the second control.

The first control may be control of a movement or an orientation of an operation object in a virtual space operated by the user, and the second control may be control different from the control of either the movement or the orientation of the operation object.

A non-transitory computer-readable storage medium having stored therein an information processing program according to an exemplary embodiment is a non-transitory computer-readable storage medium having stored therein an information processing program executed by a computer of an information processing apparatus connected to a controller so that the information processing apparatus can communicate with the controller, the controller including: an operation handler that is operated by a finger of a user; and one or more sensors that detect a user operation on the operation handler, wherein the information processing program causes the computer to execute: acquiring a shear parameter including shear direction components in at least two directions and a moment parameter including moment direction components with respect to at least two axes, the shear parameter and the moment parameter relating to the user operation on the operation handler; and based on a first input that is one of the shear parameter and the moment parameter, executing first control that is control of a movement or an orientation of an operation object in a virtual space operated by the user, and based on a second input that is the other of the shear parameter and the moment parameter, executing second control that is control different from the control of either the movement or the orientation of the operation object.

An information processing method according to an exemplary embodiment is an information processing method executed by an information processing system including a controller, the controller including: an operation handler that is operated by a finger of a user; and one or more sensors that detect a user operation on the operation handler, wherein the information processing method includes: based on output from the one or more sensors, determining a shear parameter including shear direction components in at least two directions and a moment parameter including moment direction components with respect to at least two axes, the shear parameter and the moment parameter relating to the user operation on the operation handler; and based on a first input that is one of the shear parameter and the moment parameter, executing first control that is control of a movement or an orientation of an operation object in a virtual space operated by the user, and based on a second input that is the other of the shear parameter and the moment parameter, executing second control that is control different from the control of either the movement or the orientation of the operation object.

An information processing system according to an exemplary embodiment is an information processing system including a controller and one or more processors, the controller including: an operation handler that is operated by a finger of a user; and one or more sensors that detect a user operation on the operation handler, wherein the one or more processors: based on output from the one or more sensors, determine a slide component including at least two direction components and a tilt component including at least two direction components of the user operation on the operation handler; based on a first input that is one of the slide component and the tilt component, execute first control that is control of a movement or an orientation of an operation object in a virtual space operated by the user, and based on a second input that is the other of the slide component and the tilt component, execute second control that is control different from the control of either the movement or the orientation of the operation object.

An information processing system according to an exemplary embodiment is an information processing system including a controller and one or more processors, the controller including: a first operation handler that is operated by a finger of a user and a second operation handler that is operated by another finger of the user; and one or more sensors that detect each of user operations on the first and second operation handlers, wherein the one or more processors: based on output from the one or more sensors, determine a first slide component and a first tilt component of the user operation on the first operation handler and a second slide component and a second tilt component of the user operation on the second operation handler; and based on the first slide component, control a movement of a first operation object in a virtual space, and based on the first tilt component, control an orientation of the first operation object, and based on the second slide component, control a movement of a second operation object in the virtual space, and based on the second tilt component, control an orientation of the second operation object.

The first operation object may be an object of a predetermined part of a predetermined virtual character in the virtual space, and the second operation object may be an object of another part of the virtual character.

According to the exemplary embodiment, it is possible to diversify inputs via a single operation handler or improve an application process using diversified inputs.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

1. First Exemplary Embodiment

1-1. Configuration

With reference to the drawings, an information processing system according to a first exemplary embodiment is described.

Figure 1:
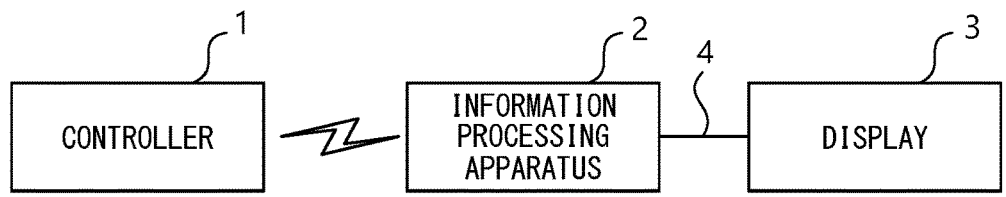
FIG. 1 is an example non-limiting block diagram showing an example of an information processing system.

FIG. 1 is a block diagram showing an example of the information processing system. The information processing system shown in FIG. 1 includes a controller 1, an information processing apparatus 2, and a display 3. The controller 1 generates operation data in accordance with an operation of a user and transmits the generated operation data to the information processing apparatus 2. The information processing apparatus 2 executes an application process based on the operation data transmitted from the controller 1 and generates an application image on which the execution result of the application process is reflected. Then, the information processing apparatus 2 outputs the generated application image to the display 3 via a dedicated line 4. The display 3 displays the application image output from the information processing apparatus 2.

Among the components of the information processing system, the controller 1 and the information processing apparatus 2 are described in detail below.

Figure 2:
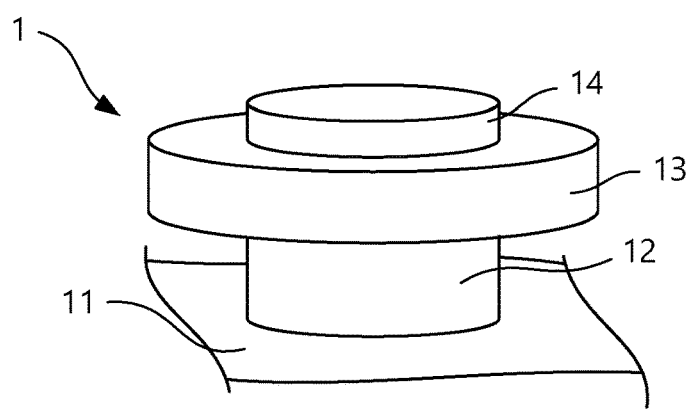
FIG. 2 is an example non-limiting diagram showing examples of the external appearances of a sensor device 12, an operation plate 13, and an operation handler 14.

The controller 1 is a one-hand controller held by one hand. The controller 1 includes a housing 11, a sensor device 12, an operation plate 13, and an operation handler 14. FIG. 2 is a diagram particularly showing examples of the external appearances of the sensor device 12, the operation plate 13, and the operation handler 14 among these components included in the controller 1. The components are described below.

Although not shown in the figures, the housing 11 has a roughly semi-ellipsoid shape. More specifically, the housing 11 is composed of a hemispherical housing main body and a cylindrical wall formed along the outer periphery of a planar portion of the housing main body. The planar portion of the housing main body and the inner peripheral surface of the cylindrical wall form a columnar recessed portion. The housing 11 is held by being sandwiched between the palm and the fingers other than the thumb of the user.

The sensor device 12 is a six-axis force sensor for detecting an operation of the user. The sensor device 12 has a roughly columnar shape. The bottom surface of the sensor device 12 is fixed to the center of the planar portion of the housing main body, and the sensor device 12 is placed in the above recessed portion. The sensor device 12 will be described in detail below.

The operation plate 13 is a circular plate-like member. The diameter of the operation plate 13 is smaller than the inner diameter of the above cylindrical wall. The center of the bottom surface of the operation plate 13 is fixed to the upper surface of the sensor device 12, and the operation plate 13 is placed in the above recessed portion. The operation plate 13 is provided to limit the movable range of the operation handler 14.

The operation handler 14 is a circular plate-like member. The diameter of the operation handler 14 is smaller than the diameter of the operation plate 13. The bottom surface of the operation handler 14 is fixed to the center of the upper surface of the operation plate 13, and the operation handler 14 protrudes further upward than the above cylindrical wall. The operation handler 14 is operated by the thumb of the user holding the housing 11.

Next, the sensor device 12 is described in detail.

Figure 3:
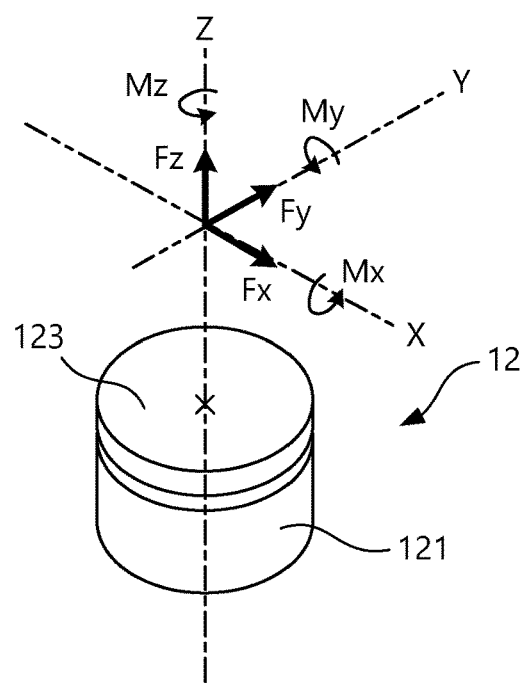
FIG. 3 is an example non-limiting perspective view of the sensor device 12.
Figure 4:
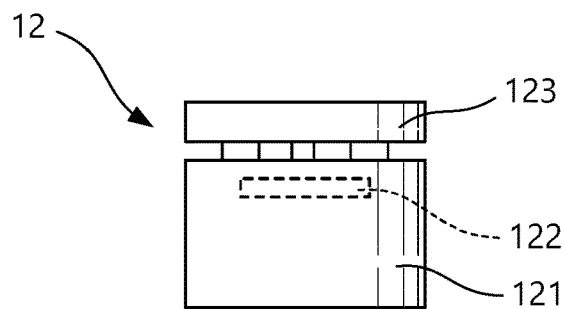
FIG. 4 is an example non-limiting side view of the sensor device 12.

FIGS. 3 and 4 are diagrams showing an example of the external appearance of the sensor device 12. FIG. 3 is a perspective view of the sensor device 12, and FIG. 4 is a side view of the sensor device 12. The sensor device 12 shown in FIGS. 3 and 4 includes a strain generator 121, a sensor chip 122, and a force receiving plate 123. The components are described below.

The strain generator 121 is a member that elastically deforms in accordance with an external force applied to an upper portion of the member.

The sensor chip 122 is accommodated in the strain generator 121, and as an example, includes a plurality of piezoresistive elements and a DSP (digital signal processor)

(neither of which is shown in the figures). The plurality of piezoresistive elements are placed so that electric resistances change in accordance with the mechanical deformation of the strain generator 121. Based on the rates of change in the resistances detected from the plurality of piezoresistive elements, the DSP calculates the shear forces and the moments of the external force applied to the strain generator 121. As shown in FIG. 3, the shear forces calculated here are a shear force Fx in an X-axis direction, a shear force Fy in a Y-axis direction, and a shear force Fz in a Z-axis direction. The shear forces Fx, Fy, and Fz are shear parameters including shear direction components in the three directions. On the other hand, as shown in FIG. 3, the moments calculated here are a moment Mx about the X-axis, a moment My about the Y-axis, and a moment Mz about the Z-axis. The moments Mx, My, and Mz are moment parameters including moment direction components with respect to the three axes. The moments can also be said to be shear forces about the axes. The DSP executes the above calculation process in a predetermined cycle and outputs the calculated shear forces and moments as six-axis data.

Next, the force receiving plate 123 is fixed on the strain generator 121 and transmits the external force applied to the upper surface of the force receiving plate 123 to the strain generator 121.

To sum up, the sensor device 12 cyclically calculates the shear forces and the moments of the external force applied to the force receiving plate 123 and outputs the calculated shear forces and moments as the six-axis data.

As the sensor device 12, a known sensor device can be appropriately used. For example, Japanese Laid-Open Patent Publication No. 2018-185296 may be referenced.

The description returns to the controller 1.

Figure 5:
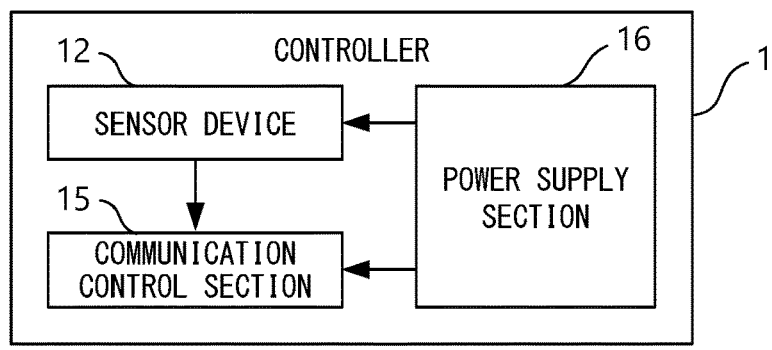
FIG. 5 is an example non-limiting block diagram showing an example of the internal configuration of a controller 1.

FIG. 5 is a block diagram showing an example of the internal configuration of the controller 1. The controller 1 shown in FIG. 5 includes the sensor device 12, a communication control section 15, and a power supply section 16. As described above, the sensor device 12 cyclically outputs six-axis data. The communication control section 15 includes a microprocessor and a memory and transmits the six-axis data output from the sensor device 12 to the information processing apparatus 2 through short-range wireless communication. The power supply section 16 includes a battery and a power control circuit and supplies power to the sensor device 12 and the communication control section 15.

Figure 6:
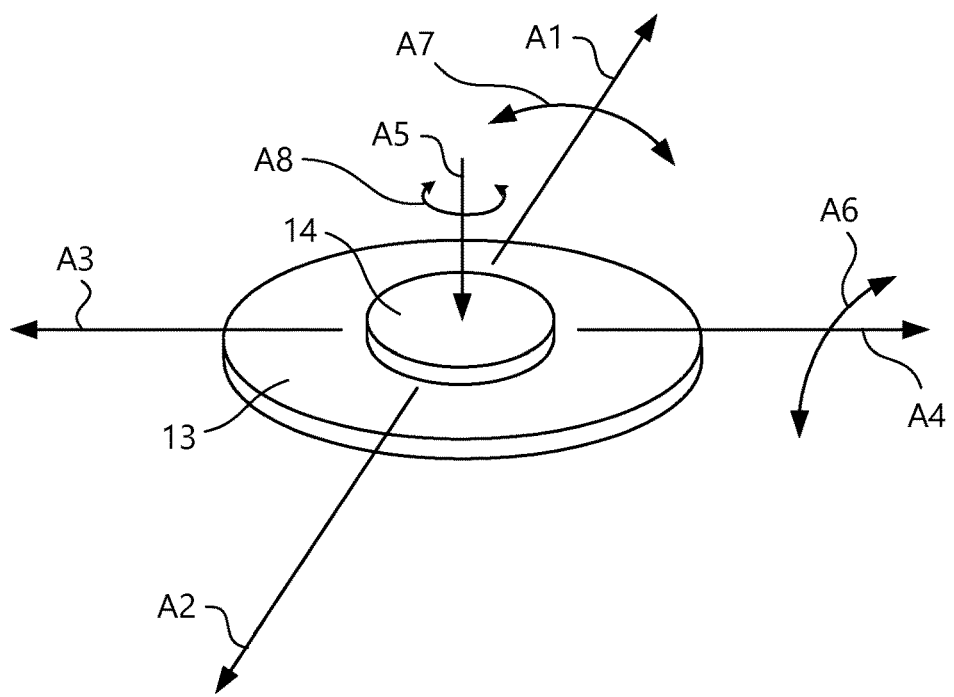
FIG. 6 is an example non-limiting diagram showing examples of operations that can be input to the controller 1.

Next, a description is given of operations that can be input to the controller 1. FIG. 6 is a diagram showing examples of the operations that can be input to the controller 1.

As shown in FIG. 2, the operation handler 14 of the controller 1 is fixed to the upper surface of the sensor device 12 through the operation plate 13. More specifically, the upper surface of the sensor device 12 to which the operation handler 14 is fixed is the upper surface of the force receiving plate 123. If the operation handler 14 is slid parallel to the housing 11, the force receiving plate 123 receives a shear force to slide the force receiving plate 123 in the same direction as the operation handler 14. This shear force is transmitted from the force receiving plate 123 to the strain generator 121, and the strain generator 121 elastically deforms in accordance with the shear force. As a result, shear parameters output from the sensor chip 122 change. The shear parameters are parameters including slide components in the three directions. The changes in the shear parameters relate to the displacement of the operation handler 14 (in other words, the force applied to the operation handler 14). The changes in the shear parameters are detected, whereby it is possible to detect operations in shear directions as indicated by arrows A1 to A5 in FIG. 6. Here, the arrows A1 to A4 in FIG. 6 indicate the operations of sliding the operation handler 14 in up, down, left, and right directions. The arrow A5 indicates the operation of pushing in the operation handler 14. Although not shown in the figures for simplicity, the controller 1 can also detect the operation of sliding the operation handler 14 in an oblique direction. In other words, the operation of sliding the operation handler 14 in the oblique direction as used herein is a slide operation between a plurality of axes (specifically, between the shear forces Fx and Fy shown in FIG. 3).

Additionally, if the operation handler 14 is tilted relative to the housing 11, the force receiving plate 123 receives a moment to tilt the force receiving plate 123 in the same direction as the operation handler 14. This moment is transmitted from the force receiving plate 123 to the strain generator 121, and the strain generator 121 elastically deforms in accordance with the moment. As a result, moment parameters output from the sensor chip 122 change. The moment parameters are parameters including tilt components in the three directions. The changes in the moment parameters relate to the displacement of the operation handler 14 (in other words, the force applied to the operation handler 14). The changes in the moment parameters are detected, whereby it is possible to detect operations in moment directions as indicated by arrows A6 to A8 in FIG. 6. Here, the arrow A6 in FIG. 6 indicates the operation of tilting the operation handler 14 in the up-down direction. The arrow A7 indicates the operation of tilting the operation handler 14 in the left-right direction. The arrow A8 indicates the operation of rotating the operation handler 14. Although not shown in the figures for simplicity, the controller 1 can also detect the operation of tilting the operation handler 14 in an oblique direction. In other words, the operation of tilting the operation handler 14 in the oblique direction as used herein is a tilt operation between a plurality of axes (specifically, between X and Y shown in FIG. 3).

Figure 7:
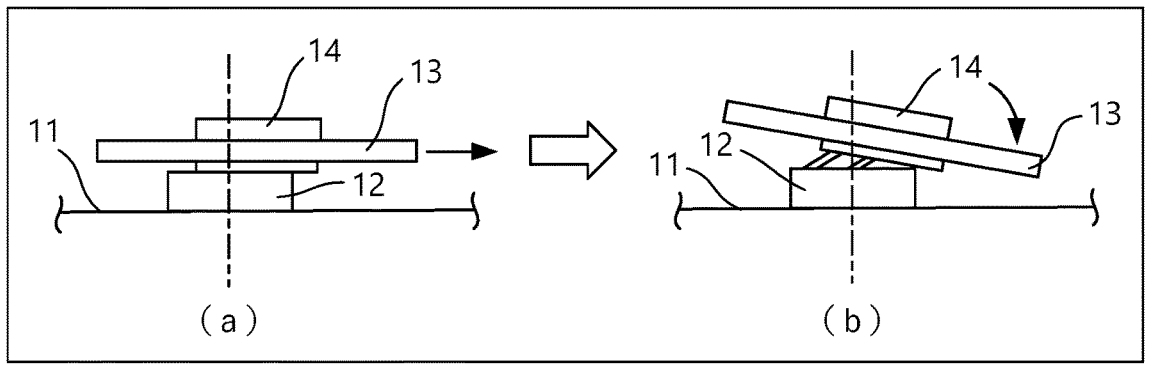
FIG. 7 is an example non-limiting diagram showing an example of an operation on the controller 1.
Figure 8:
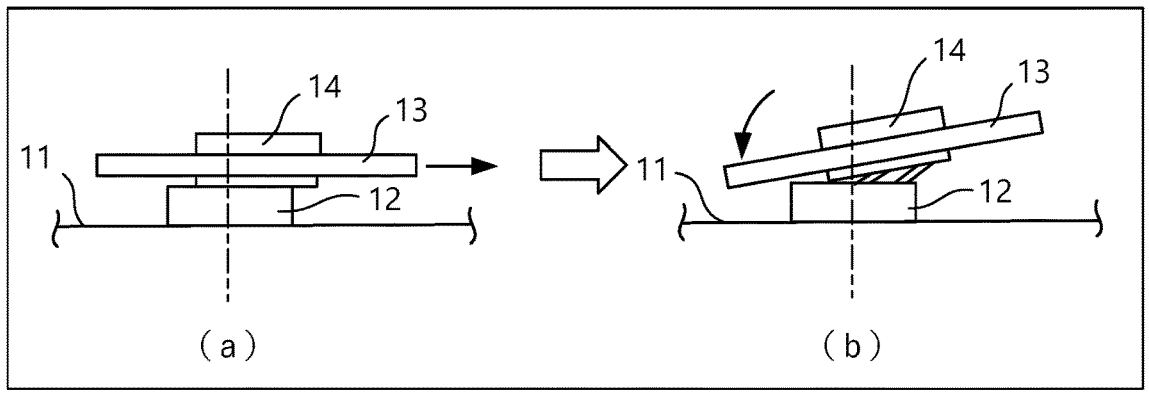
FIG. 8 is an example non-limiting diagram showing an example of an operation on the controller 1.

An operation in a shear direction and an operation in a moment direction are detected separately from each other. Thus, the direction in which the operation handler 14 is slid and the direction in which the operation handler 14 is tilted may not necessarily be the same. For example, as illustrated in FIG. 7(a), in the state where the operation handler 14 is slid in the right direction in FIG. 7(a), and as illustrated in FIG. 7(b), if the operation handler 14 is tilted in the right direction in FIG. 7(b), each of the slide operation in the right direction and the tilt operation in the right direction is detected. In contrast, as illustrated in FIG. 8(a), in the state where the operation handler 14 is slid in the right direction in FIG. 8(a), and as illustrated in FIG. 8(b), if the operation handler 14 is tilted in the left direction in FIG. 8(b), each of the slide operation in the right direction and the tilt operation in the left direction is detected. As shown in this example, the direction in which the operation handler 14 is slid and the direction in which the operation handler 14 is tilted may not necessarily be the same.

This is the description of the controller 1.

According to the above controller 1, it is possible to input two operations, namely an operation in a shear direction and an operation in a moment direction, via the operation handler 14.

Next, the information processing apparatus 2 is described.

Figure 9:
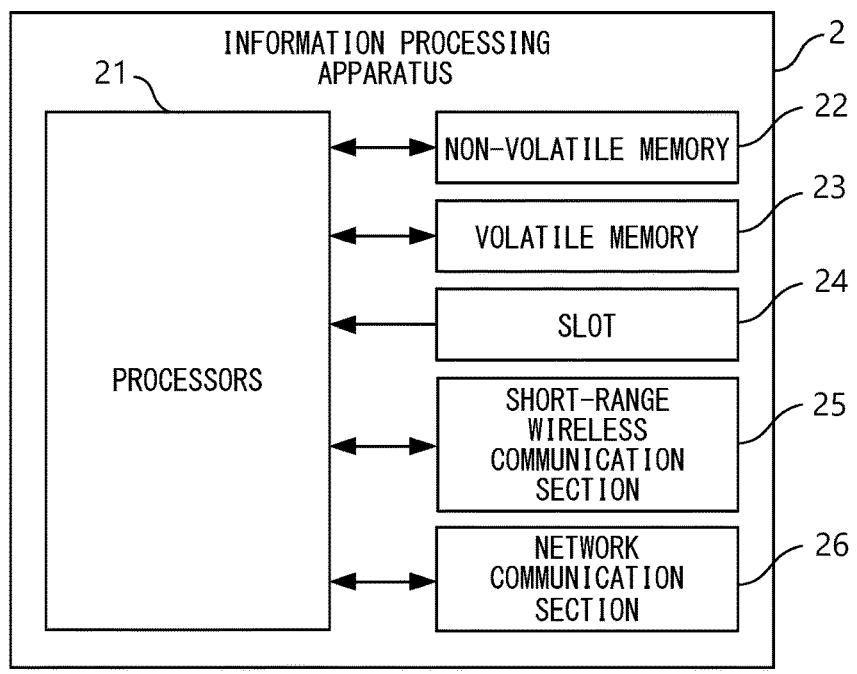
FIG. 9 is an example non-limiting block diagram showing an example of the internal configuration of an information processing apparatus 2.

FIG. 9 is a block diagram showing an example of the internal configuration of the information processing apparatus 2. The information processing apparatus 2 shown in FIG. 9 includes one or more processors 21 such as CPUs, a non-volatile memory 22 such as a flash memory, a volatile memory 23 such as a DRAM, a slot 24 to which an external storage medium such as a memory card is attachable, a short-range wireless communication section 25 that performs short-range wireless communication with the controller 1, and a network communication section 26 that wirelessly communicates with an external apparatus using a wireless LAN method.

Into the volatile memory 23 included in the information processing apparatus 2, an application program is loaded from the non-volatile memory 22 or the external storage medium. If the loaded application program is executed by the processors 21, a predetermined application can be executed.

In this application, a three-dimensional virtual space is defined. Then, in the virtual space, an operation object operated by the user and a background object are placed. Additionally, in the virtual space, a virtual camera is placed. The virtual camera moves by following the operation object, and an image captured by the virtual camera is displayed on the display 3.

Figure 10:
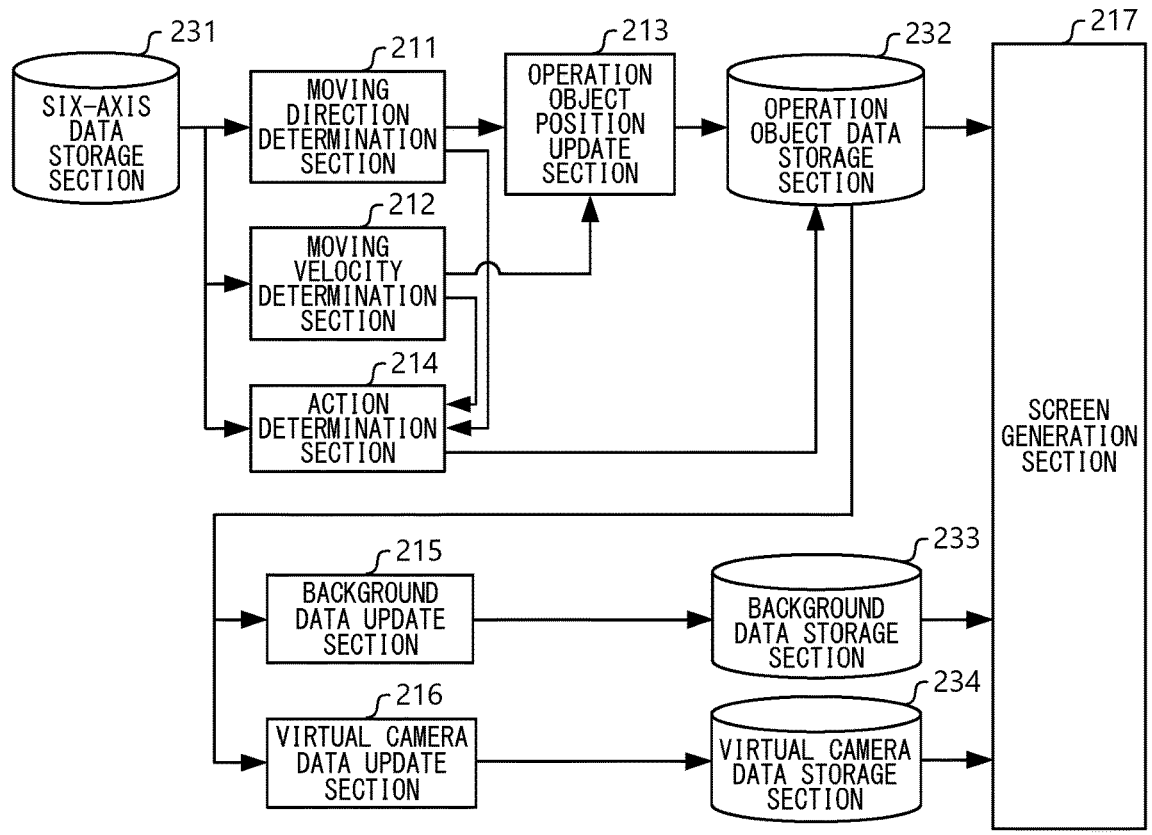
FIG. 10 is an example non-limiting block diagram showing an example of the functional configuration of the information processing apparatus 2.

To enable the application to be operated, the information processing apparatus 2 executes a predetermined application process on a frame-by-frame basis. FIG. 10 is a block diagram showing an example of the functional configuration for executing the application process. Functions shown in FIG. 10 are provided by the processors 21 executing the application program. The functions are described below.

A six-axis data storage section 231 stores six-axis data sequentially output from the controller 1 in chronological order.

A moving direction determination section 211 determines the moving direction of the operation object based on the latest shear parameters stored in the six-axis data storage section 231.

A moving velocity determination section 212 determines the moving velocity of the operation object based on the latest shear parameters stored in the six-axis data storage section 231.

An operation object data storage section 232 stores data indicating the position of the operation object in the virtual space and data indicating the action of the operation object.

An operation object position update section 213 determines the current position of the operation object based on the moving direction determined by the moving direction determination section 211 and the moving velocity determined by the moving velocity determination section 212. Then, the operation object position update section 213 updates the position data stored in the operation object data storage section 232 using the data indicating the determined current position. By this update process, the movement of the operation object is controlled.

The action determination section 214 determines the action of the operation object based on the latest moment parameters stored in the six-axis data storage section 231, the moving direction determined by the moving direction determination section 211, and the moving velocity determined by the moving velocity determination section 212. Then, the action determination section 214 updates action data stored in the operation object data storage section 232 using data indicating the determined action. By this update process, the action of the user operation object is controlled.

The action determined by the action determination section 214 is some behavior of the operation object, but examples of the action do not include a mere movement. Examples of the action include a behavior involving a movement.

A background data storage section 233 stores data indicating the position of a background object in the virtual space and data indicating the state of the background object.

A background data update section 215 updates the pieces of data stored in the background data storage section 233 based on the pieces of data stored in the operation object data storage section 232.

A virtual camera data storage section 234 stores data indicating the position of the virtual camera in the virtual space and data indicating the orientation of the virtual camera.

A virtual camera data update section 216 updates the pieces of data stored in the virtual camera data storage section 234 based on the pieces of data stored in the operation object data storage section 232.

A screen generation section 217 generates screen data based on the pieces of data stored in the operation object data storage section 232, the background data storage section 233, and the virtual camera data storage section 234. The generated screen data is output to the display 3 via the dedicated line 4 and displayed on the display 3.

This is the description of the information processing apparatus 2.

1-2. Operation

Figure 11:
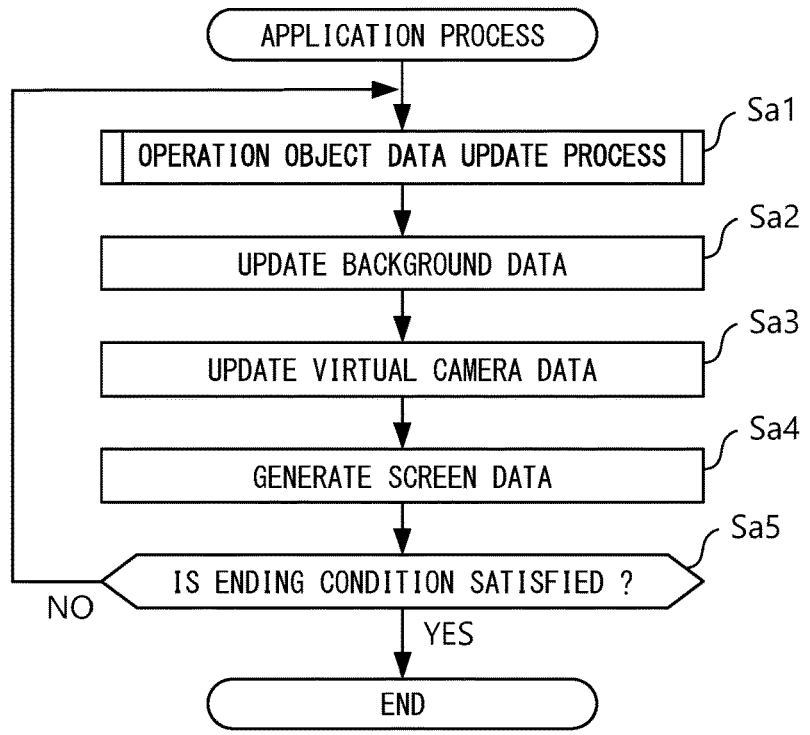
FIG. 11 is an example non-limiting flow chart showing an example of an application process.

The application process executed by the information processing apparatus 2 is described in more detail. FIG. 11 is a flow chart showing an example of the application process.

Figure 12:
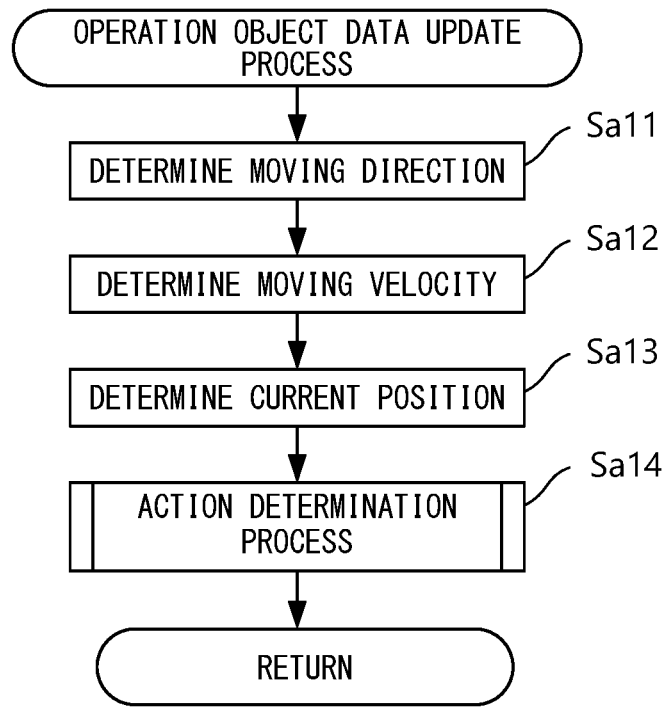
FIG. 12 is an example non-limiting flow chart showing an example of an operation object data update process.

In step Sa1 in the application process shown in FIG. 11, an operation object data update process is executed. FIG. 12 is a flow chart showing an example of the operation object data update process.

In step Sa11 in the operation object data update process shown in FIG. 11, the moving direction determination section 211 determines the moving direction of the operation object based on the latest shear parameters stored in the six-axis data storage section 231. At this time, the moving direction determination section 211 calculates a resultant vector from an X-axis direction component and a Y-axis direction component of the latest shear parameters and identifies the direction of the calculated resultant vector as the moving direction.

After the moving direction is identified, next, the moving velocity determination section 212 determines the moving velocity of the operation object based on the latest shear parameters stored in the six-axis data storage section 231 (step Sa12). At this time, first, the moving velocity determination section 212 calculates a resultant vector from the X-axis direction component and the Y-axis direction component of the latest shear parameters. Then, the moving velocity determination section 212 determines whether or not the magnitude of the calculated resultant vector is greater than or equal to a predetermined threshold. As a result of this determination, if the magnitude of the resultant vector is greater than or equal to the predetermined threshold, the moving velocity is identified as "high". On the other hand, as a result of this determination, if the magnitude of the resultant vector is less than the predetermined threshold, the moving velocity is identified as "low".

After the moving velocity is identified, the operation object position update section 213 determines the current position of the operation object based on the moving direction determined in step Sa11 and the moving velocity determined in step Sa12. Then, using data indicating the determined current position, the operation object position update section 213 updates the position data stored in the operation object data storage section 232 (step Sa13).

Figure 13:
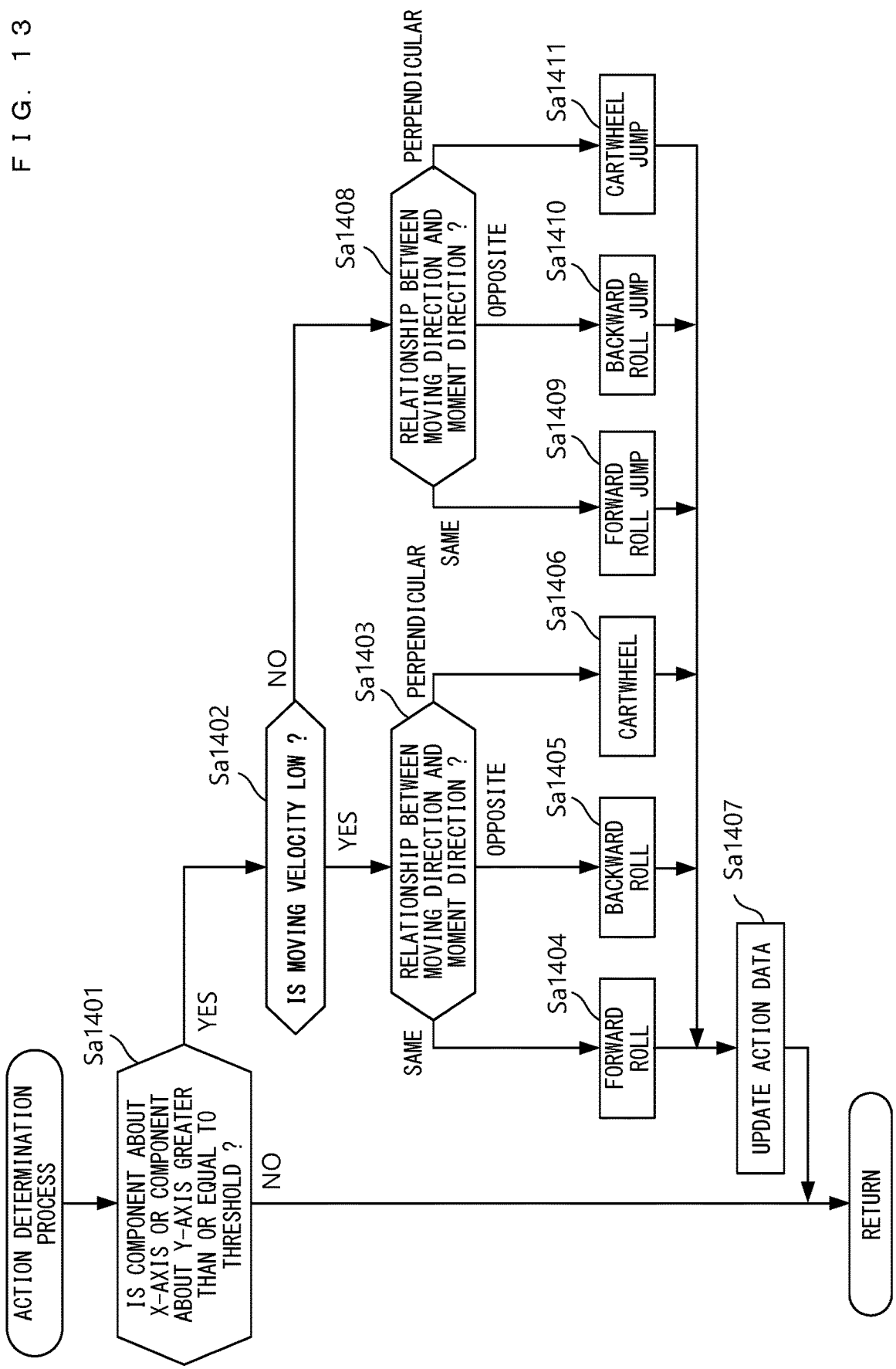
FIG. 13 is an example non-limiting flow chart showing an example of an action determination process.

After the position data is updated, next, the action determination section 214 determines the action of the operation object based on the latest moment parameters stored in the six-axis data storage section 231, the moving direction determined in step Sa11, and the moving velocity determined in step Sa12 (step Sa14). FIG. 13 is a flow chart showing an example of the action determination process.

In step Sa1401 in the action determination process shown in FIG. 13, the action determination section 214 determines whether or not a component about the X-axis or a component about the Y-axis of the moment parameters is greater than or equal to a predetermined threshold. As a result of this determination, if the components about both axes are less than the predetermined threshold (NO in step Sa1401), this action determination process ends.

On the other hand, as a result of the determination in step Sa1401, if the component about either axis is greater than or equal to the predetermined threshold (YES in step Sa1401), next, the action determination section 214 determines whether or not the moving velocity determined in step Sa12 is "low" (step Sa1402). As a result of this determination, if the moving velocity is "low" (YES in step Sa1402), next, the action determination section 214 determines the relationship between the moving direction determined in step Sa11 and the moment direction (in other words, the tilt direction of the operation handler 14) (step Sa1403). As a result of this determination, if the moving direction and the moment direction are the same direction, the action is identified as a "forward roll" (step Sa1404). If the moving direction and the moment direction are opposite directions, the action is identified as a "backward roll" (step Sa1405). If the moving direction and the moment direction have a perpendicular relationship, the action is identified as a "cartwheel" (step Sa1406). In this process, the case where the moving direction and the moment direction are the same direction includes not only a case where the two directions strictly match each other, but also a case where the angle of the two directions is less than or equal to a predetermined threshold. For example, in a case where the moment direction is included in the range of 45 degrees to the left and right about the moving direction, this case may be regarded as "the same direction". The same applies to a case where the two directions are opposite directions and a case where the two directions have a perpendicular relationship.

If the action is identified, next, the action determination section 214 updates the action data stored in the operation object data storage section 232 using data indicating the identified action (step Sa1407). If the action data is updated, the action determination process ends.

On the other hand, as a result of the determination in the above step Sa1402, if the moving velocity is not "low" (i.e., if the moving velocity is "high") (NO in step Sa1402), next, the action determination section 214 determines the relationship between the moving direction determined in step Sa11 and the moment direction (step Sa1408). As a result of this determination, if the moving direction and the moment direction are the same direction, the action is identified as a "forward roll jump" (step Sa1409). If the moving direction and the moment direction are opposite directions, the action is identified as a "backward roll jump" (step Sa1410). If the moving direction and the moment direction have a perpendicular relationship, the action is identified as a "cartwheel jump" (step Sa1411). Then, the action determination section 214 executes the above step Sa1407.

This is the description of the action determination process.

Figures 14, 15:
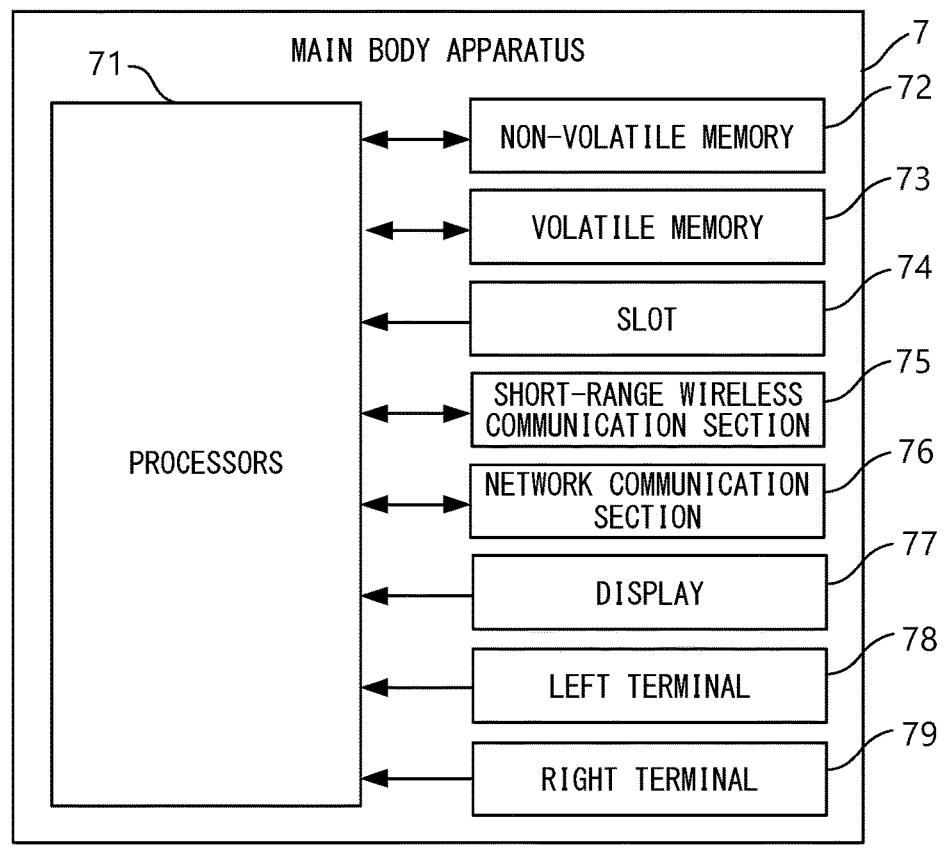
FIG. 14 is an example non-limiting diagram showing a list of actions.
FIG. 15 is an example non-limiting block diagram showing an example of the internal configuration of a main body apparatus 7.

FIG. 14 is a diagram showing a list of actions to be determined in the action determination process. As shown in FIG. 14, an action to be determined changes in accordance with the moving velocity and the relationship between the moving direction and the moment direction. For example, if the user tilts the operation handler 14 of the controller 1 in the right direction in the state where the operation handler 14 is slightly slid in the right direction (i.e., if the moving velocity is "low" and the moving direction and the moment direction are the same direction), the action is identified as the "forward roll". In contrast, if the user tilts the operation handler 14 in the left direction in the state where the operation handler 14 is greatly slid in the right direction (i.e., if the moving velocity is "high" and the moving direction and the moment direction are opposite directions), the action is identified as the "backward roll jump".

The above action determination process is based on the premise that the operation object moves in any of the directions. If the operation object does not move (in other words, if an operation in a shear direction is not input), and if only an operation in a moment direction is input, the action is determined in accordance with the moment direction (in other words, the tilt direction of the operation handler 14). Specifically, if the operation handler 14 is tilted in the up direction, the action is identified as the "forward roll". If the operation handler 14 is tilted in the left-right direction, the action is identified as the "cartwheel". If the operation handler 14 is tilted in the down direction, the action is identified as the "backward roll". Alternatively, the action may be determined in accordance with the direction of the operation object when an operation in a moment direction is input. For example, in the state where the operation object stops while facing the right direction, and if the operation handler 14 is tilted in the right direction, the action may be identified as the "forward roll". If the operation handler 14 is tilted in the up-down direction, the action may be identified as the "cartwheel". If the operation handler 14 is tilted in the left direction, the action may be identified as the "backward roll".

If the action determination process ends, as shown in FIG. 12, the operation object data update process ends.

If the operation object data update process ends, next, the background data update section 215 updates the pieces of data stored in the background data storage section 233 based on the pieces of data stored in the operation object data storage section 232 (step Sa2).

After the background data is updated, next, the virtual camera data update section 216 updates the pieces of data stored in the virtual camera data storage section 234 based on the pieces of data stored in the operation object data storage section 232 (step Sa3).

After the virtual camera data is updated, next, the screen generation section 217 generates screen data based on the pieces of data stored in the operation object data storage section 232, the background data storage section 233, and the virtual camera data storage section 234 (step Sa4). The generated screen data is output to the display 3 via the dedicated line 4 and displayed on the display 3.

The above steps Sa1 to Sa4 are repeatedly executed until a predetermined ending condition for the application is satisfied. If the predetermined ending condition is satisfied (YES in step Sa5), this application process ends.

This is the description of the application process.

2. Second Exemplary Embodiment

With reference to the drawings, an information processing system according to a second exemplary embodiment is described.

The information processing system according to the exemplary embodiment includes two controllers 1 according to the first exemplary embodiment and a main body apparatus 7. Between the two controllers 1, a controller 1 attached to the left side when facing the front of the main body apparatus 7 is referred to as a "left controller 6L", and a controller 1 attached to the right side when facing the front of the main body apparatus 7 is referred to as a "right controller 6R". These controllers are referred to simply as "controllers 6" if the controllers do not need to be particularly distinguished from each other.

Each of the controllers 6 generates operation data in accordance with an operation of a user and outputs the generated operation data to the main body apparatus 7. The main body apparatus 7 executes an application process based on the operation data transmitted from the controller 6 and displays an application image on which the execution result of the application process is reflected.

The left controller 6L and the right controller 6R are attachable to and detachable from the main body apparatus 7. A use method for using these controllers 6 includes the following four methods. A first use method is a method in which a single user uses the two controllers 6 attached to the main body apparatus 7. A second use method is a method in which a single user uses the two controllers 6 detached from the main body apparatus 7. A third use method is a method in which a single user uses one of the controllers 6 detached from the main body apparatus 7. A fourth use method is a method in which a first user uses one of the controllers 6 detached from the main body apparatus 7, and a second user uses the other detached controller 6.

The main body apparatus 7 included in this information processing system is described in detail below.

FIG. 15 is a block diagram showing an example of the internal configuration of the main body apparatus 7. The main body apparatus 7 shown in FIG. 15 includes one or more processors 71 such as CPUs, a non-volatile memory 72 such as a flash memory, a volatile memory 73 such as a DRAM, a slot 74 to which an external storage medium such as a memory card is attachable, a short-range wireless communication section 75 that performs short-range wireless communication with the controllers 6, a network communication section 76 that wirelessly communicates with an external apparatus using a wireless LAN method, a display 77 such as an LCD, a left terminal 78 that performs wired communication with the left controller 6L, and a right terminal 79 that performs wired communication with the right controller 6R.

Into the volatile memory 73 included in the main body apparatus 7, an application program is loaded from the non-volatile memory 72 or the external storage medium. If the loaded application program is executed by the processor 71, a predetermined application can be executed. Here, as the application that can be executed, the application described in the first exemplary embodiment is assumed.

The application described in the first exemplary embodiment can also be simultaneously operated by two users. In a case where the application is simultaneously operated by two users, two operation objects are placed in a virtual space. One of the operation objects is operated by a first user who uses the left controller 6L, and the other operation object is operated by a second user who uses the right controller 6R. The operation objects are followed by different virtual cameras.

If the application is executed by the above third or fourth use method for using the controllers 6, an application process in a first operation mode is executed. In the application process in the first operation mode, two operations, namely an operation in a shear direction and an operation in a moment direction, are input to each of the left controller 6L and the right controller 6R via a single operation handler 14. In contrast, if the application is executed by the above first or second use method for using the controllers 6, an application process in a second operation mode is executed. In the application process in the second operation mode, two operations, namely an operation in a shear direction and an operation in a moment direction, are input via the two operation handlers 14 of the left controller 6L and the right controller 6R. In accordance with the use method for using the controllers 6, it is determined in which operation mode the application process is to be executed.

Between the two application processes, the functional configuration for executing the application process in the first operation mode is basically similar to the functional configuration according to the first exemplary embodiment (see FIG. 10). Additionally, the application process in the first operation mode is basically similar to the application process according to the first exemplary embodiment (see FIGS. 11 to 13). In the exemplary embodiment, however, the six-axis data storage section 231 stores six-axis data sequentially output from the controllers 6 instead of the controller 1 in chronological order. Additionally, the screen generation section 217 displays generated screen data on the display 77 or an external display instead of the display 3 (see step Sa4 in FIG. 11).

In the application process, two operations, namely an operation in a shear direction and an operation in a moment direction, are input via a single operation handler 14 of each of the controllers 6.

Figure 16:
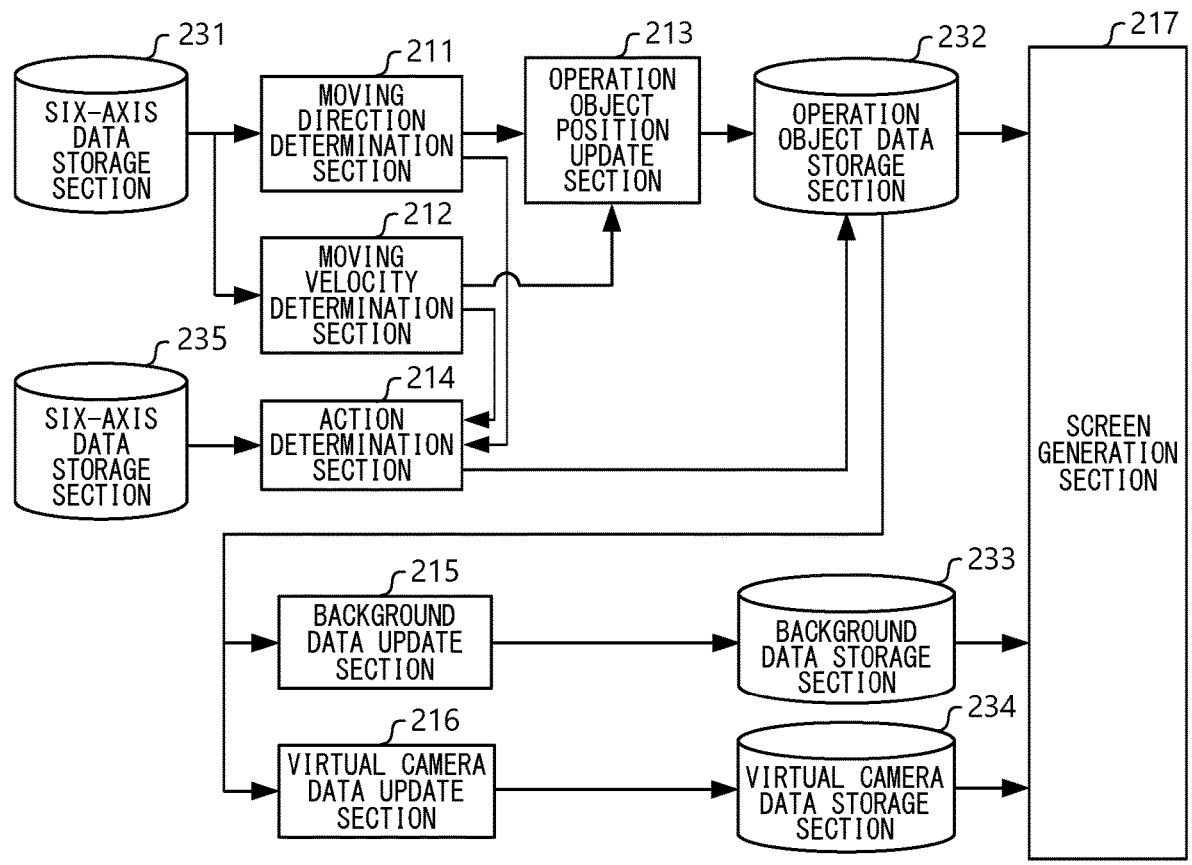
FIG. 16 is an example non-limiting block diagram showing an example of the functional configuration of the main body apparatus 7.

Next, the functional configuration for executing the application process in the second operation mode is described. FIG. 16 is a block diagram showing an example of the functional configuration. The functional configuration shown in FIG. 16 is basically similar to the functional configuration according to the first exemplary embodiment (see FIG. 10). Additionally, the application process in the second operation mode is also basically similar to the application process according to the first exemplary embodiment. The functional configuration according to the exemplary embodiment, however, is different from the functional configuration according to the first exemplary embodiment in that a six-axis data storage section 235 is added. The newly added six-axis data storage section 235 stores six-axis data sequentially output from the right controller 6R in chronological order.

Additionally, in the exemplary embodiment, the six-axis data storage section 231 stores six-axis data sequentially output from the left controller 6L instead of the controller 1 in chronological order. Additionally, the action determination section 214 determines the actions of the operation objects based on the latest moment parameters stored in the six-axis data storage section 235 instead of the six-axis data storage section 231 (see step Sa14 in FIG. 12). In other words, the action determination section 214 determines the actions based on the moment parameters sequentially output from the right controller 6R. Additionally, the screen generation section 217 displays generated screen data on the display 77 or an external display instead of the display 3 (see step Sa4 in FIG. 11).

In the application process, two operations, namely an operation in a shear direction and an operation in a moment direction, are input via the two operation handlers 14 of the left controller 6L and the right controller 6R.

3. Variations

The above exemplary embodiments may be modified as described below. The following variations may be combined with each other.

3-1. Variation 1

In the above exemplary embodiments, the movement of an operation object is controlled based on the shear parameters. A target controlled based on the shear parameters is not limited to the movement of the operation object. For example, the action may be controlled instead of the movement. These actions may be performed, for example, when the operation handler 14 is pushed in. Similarly, in the above exemplary embodiments, the action of the operation object is controlled based on the moment parameters. The movement or the orientation, however, may be controlled instead of the action. In the above exemplary embodiments, the moving velocity is determined based on the shear parameters. The moving velocity, however, may be constant.

3-2. Variation 2

In the above exemplary embodiments, the action of an operation object is controlled based on the moment parameters. The action of the operation object is not limited to the examples in the above exemplary embodiments. For example, the action of jumping may be performed when the operation handler 14 is tilted in the up direction, and the action of crouching may be performed when the operation handler 14 is tilted in the down direction.

As yet another action, the action of the operation object rotating an object such as a doorknob held by the operation object in the virtual space may be employed. These actions may be performed, for example, when the operation handler 14 is rotated.

As yet another action, in the scene where the operation object crosses a narrow bridge, the movement of the center of gravity of the operation object may be controlled.

As another example, the movement and/or the orientation of the virtual camera may be controlled based on the moment parameters, instead of the action of the operation object. For example, when the operation handler 14 is tilted in the up-down direction, the virtual camera may be rotationally moved in a pitch direction. When the operation handler 14 is tilted in the left-right direction, the virtual camera may be rotationally moved in a yaw direction. When the operation handler 14 is rotated, the operation handler 14 may be rotated in a roll direction. The virtual camera may be placed in the virtual space so that the virtual camera can capture an image of a first-person viewpoint. Instead of this, the virtual camera may be placed in the virtual space so that the virtual camera can capture an image of a third-person viewpoint.

3-3. Variation 3

An operation object may be not only a living object, but also, for example, an airframe. In a case where the operation object is an airframe that flies, the orientation and the action of the airframe may be controlled based on the shear parameters and the moment parameters. Specifically, when the operation handler 14 is slid in the up direction, the action of temporarily accelerating the airframe that is flying may be executed. When the operation handler 14 is slid in the down direction, the action of temporarily decelerating the airframe that is flying may be executed. Additionally, when the operation handler 14 is tilted in the up-down direction, the airframe may be rotated in a pitch direction. When the operation handler 14 is tilted in the left-right direction, the airframe may be rotated in a roll direction. When the operation handler 14 is rotated, the airframe may be rotated in a yaw direction. As another type of control, when the operation handler 14 is slid in the left-right direction, the airframe may be rotated in the yaw direction.

As yet another example, the operation object may be a piece of a puzzle. For example, the movement of a piece that falls as the operation object in the left-right direction or the down direction may be controlled based on the shear parameters, and the orientation of the operation object may be controlled based on the moment parameters.

3-4. Variation 4

In the above exemplary embodiments, an operation in a shear direction and an operation in a moment direction are input via a single operation handler. Thus, when one of the operations is input, the other operation may also be unintentionally input. For example, it is possible that when the operation handler 14 is slid in the right direction, the operation handler 14 is unintentionally tilted in the right direction. As another example, it is possible that when the operation handler 14 is tilted to the near side, the operation handler 14 is unintentionally slid in the down direction. To prevent unintended control based on such operations, it is possible that an input amount required to control the movement and an input amount required to control the action are varied. Specifically, a threshold for determining the movement and a threshold for determining whether the action is necessary are varied. Here, varying the thresholds means, for example, that the first threshold is set to a threshold to be exceeded when the operation handler 14 is slid by 5% or more of the maximum slide width, while the second threshold is set to a threshold to be exceeded when the operation handler 14 is tilted by 20% or more of the maximum tilt angle. The thresholds are thus varied, it is possible to prevent unintended control as described above. In a case where certain thresholds are provided as described above for both inputs, and even if operations in a shear direction and a moment direction are unintentionally input particularly when the operation of the operation handler 14 is started, it is possible to prevent the execution of unintended control according to the inputs.

As a method for varying the required input amounts, another method is also possible. The above two thresholds may not be varied, and a value to be compared with one of the above two thresholds may be corrected. Here, not varying the above two thresholds means, for example, that the first threshold is set to a threshold to be exceeded when the operation handler 14 is slid by 5% or more of the maximum slide width, while the second threshold is also set to a threshold to be exceeded when the operation handler 14 is tilted by 5% or more of the maximum tilt angle. As described above, the above two thresholds are not varied, and a comparison target of one of the thresholds is corrected, whereby it is also possible to prevent unintended control as described above.

As another example, the input amount required to execute one of the types of control may be varied based on the execution state of the other type of control. For example, in the state where the movement is not controlled based on the slide operation on the operation handler 14, the input amount of an operation in a moment direction required to control the action is set to an α value. In the state where the movement is controlled, the input amount required to control the action may be set to a β value (β>α). That is, only while the movement is controlled, the input amount required for an operation in a moment direction may be increased. At this time, the β value may be set to a value exceeding an amount that can be input by the user. In this case, while the movement is controlled, the action may not be controlled.

As another example, in a case where there is an indication that the two types of control are simultaneously performed, the input amounts required for the two types of control may be varied as described above. For example, even if the movement is not controlled, but in the state where an operation in a shear direction required to control the movement is performed, and control of the movement is started by pressing a predetermined operation button, the input amount required to control the action may be increased from the α value to the β value. As another example, even if the movement is not controlled, but when a predetermined input smaller than the input amount required to control the movement is provided, the input amount required to control the action may be increased from the α value to the β value.

3-5. Variation 5

In the above exemplary embodiments, if the slide width of an operation handler 14 exceeds a predetermined amount, the moving velocity of the operation object changes from "low" to "high". Instead of this, the moving velocity of the operation object may be linearly increased with respect to the slide width. Additionally, in the above exemplary embodiments, the action of the operation object is controlled based on the moment parameters. Instead of this, the movement of the virtual camera may be controlled based on the moment parameters. At this time, it is possible that the amount of movement of the virtual camera is linearly increased with respect to the tilt angle of the operation handler 14. If, however, the amount of movement of the virtual camera is also linearly increased in addition to the moving velocity of the operation object, the above unintended control based on an unintended operation is likely to occur. Accordingly, to prevent such unintended control, the amount of movement of the virtual camera may be increased in a stepwise manner with respect to the tilt angle (in other words, a staircase manner). Specifically, for example, when the tilt angle exceeds a first threshold, the virtual camera may be rotationally moved by 45 degrees. When the tilt angle exceeds a second threshold, the virtual camera may be further rotationally moved by 45 degrees. As described above, the amount of movement of the virtual camera is changed in a stepwise manner, whereby it is possible to prevent unintended control as described above.

The above linear increase in the moving velocity is, in other words, a stepwise increase in the moving velocity and an increase having steps finer than an increase in the amount of movement of the virtual camera. The amount of movement of the virtual camera is increased by the tilt angle digitally changing multiple times, whereas the moving velocity is increased by the slide width digital changing the number of times smaller than the multiple times.

Instead of the amount of movement of the virtual camera, the moving velocity of the operation object may be changed in a stepwise manner.

As another method for preventing unintended control as described above, if one of control of the movement of the operation object and control of the movement of the virtual camera or control of the action is executed, the other control may be prohibited. It is also possible to prevent unintended control as described above by such a method.

3-6. Variation 6

In the above first exemplary embodiment, the type of the action is determined in accordance with the relationship between the moving direction of the operation object and the moment direction (see FIG. 14). Instead of this, the type of the action may be determined in accordance with only the moment direction, regardless of the moving direction of the operation object.

As another determination method for determining the action, if an operation in a moment direction is input, the type of the action may be determined in accordance with only the moving direction of the operation object, regardless of the direction of the moment direction. For example, when the moving direction of the operation object is the screen depth direction, the action may be identified as the "forward roll". When the moving direction of the operation object is the left-right direction, the action may be identified as the "cartwheel". When the moving direction of the operation object is the near direction, the action may be identified as the "backward roll".

As another determination method for determining the action, the type of the action may be determined in accordance with the moving velocity of the operation object. For example, when the moving velocity of the operation object is "low", the action may be identified as the "forward roll". When the moving velocity of the operation object is "high", the action may be identified as the "forward roll jump".

3-7. Variation 7

In the above second exemplary embodiment, each of the left controller 6L and the right controller 6R includes an operation handler 14, and an operation mode can be switched between the first operation mode and the second operation mode. Instead of this, a single controller may include two operation handlers 14, and the operation mode of the controller may be able to be switched between the first operation mode and the second operation mode. In other words, it may be possible to switch whether an operation in a shear direction and an operation in a moment direction using the controller can be input using one of the operation handlers 14 or can be input using the two operation handlers 14.

3-8. Variation 8

In the above first exemplary embodiment, it may be possible to switch an operation mode between an operation mode where both an operation in a shear direction and an operation in a moment direction can be input via an operation handler 14 and an operation mode where only either one of the operations can be input. In this case, when the second operation mode is selected, the other operation may be able to be input via another button or stick. As another example, parameters output as a result of the other operation may be reflected on control based on one of the operations. For example, in a case where one of the operations is an operation in a shear direction and the other operation is an operation in a moment direction, a moment parameter may be multiplied by a predetermined ratio, thereby converting the moment parameter into a shear parameter. Then, the shear parameter may be added to a shear parameter output as a result of the operation in the shear direction. As another example, a shear parameter obtained by conversion may be compared with a shear parameters output as a result of an operation in a shear direction, and the movement of an operation object may be controlled based on the greater shear parameter.

3-9. Variation 9

The sensor device 12 is an example of a multiaxis sensor for detecting an operation of the user. A sensor device to be used may be appropriately selected in accordance with the type of an operation as a detection target or the structure of a controller on which the sensor device is mounted. The sensor device 12 may be replaced with a combination of a sensor device for detecting shear forces in the three directions and a sensor device for detecting moments about the three axes.

3-10. Variation 10

In the above exemplary embodiments, the movement and the action of an operation object are a control target. Instead of this, the movement and the orientation of a hand as the operation object may be a control target. More specifically, the movement of the hand may be controlled in accordance with one of a shear parameter and a moment parameter, and the orientation of the hand may be controlled in accordance with the other.

Conventionally, in a case where the movement or the orientation of a hand is controlled, a six-axis acceleration sensor is used, or a motion capture is used. In either case, however, the user needs to move the entirety of the hand or the arm. In contrast, if a hand is a control target in the above exemplary embodiments, by an operation using a finger, it is possible to control the movement and the orientation of the hand larger than the finger.

As another example, for example, in a case where two operation handlers are included as in the second exemplary embodiment, a left hand object can be controlled by one of the operation handlers, and a right hand object can be controlled by the other operation handler. At this time, one of a shear parameter and a moment parameter input via one of the operation handlers is used to control the movement of the left hand object, and the other is used to control the orientation of the left hand object. Additionally, one of a shear parameter and a moment parameter input via the other operation handler is used to control the movement of the right hand object, and the other is used to control the orientation of the right hand object. As a result, for example, by an operation using two fingers, it is possible to perform the operation of scooping up an object such as water with both hand objects.

The hand is merely an example, and another part of a virtual character may be a control target.

3-11. Variation 11

The information processing apparatus 2 is an example of an information processing apparatus capable of executing the above application program. Instead of the information processing apparatus 2, another information processing apparatus such as a smartphone may execute the above application program.

3-12. Variation 12

In the above first exemplary embodiment, some of the functions of the controller 1 may be achieved by the information processing apparatus 2. For example, the process of generating six-axis data based on the rates of change in the resistances detected from the plurality of piezoresistive elements that is executed by the controller 1 may be executed by the processors 21 of the information processing apparatus 2. Conversely, some or all of the functions of the information processing apparatus 2 may be achieved by the controller 1.

In the above second exemplary embodiment, some of the functions of the controllers 6 may be achieved by the main body apparatus 7. Conversely, some or all of the functions of the main body apparatus 7 may be achieved by the controllers 6.

3-13. Variation 13

In the second operation mode in the above second exemplary embodiment, an operation in a shear direction is input using the left controller 6L, and an operation in a moment direction is input using the right controller 6R. Instead of this, an operation in a moment direction may be input using the left controller 6L, and an operation in a shear direction may be input using the right controller 6R.

3-14. Variation 14

In the above first exemplary embodiment, the type of the action is determined in accordance with the relationship between the moving direction of the operation object and an operation in a moment direction (see FIG. 14). At this time, the direction of the action may be determined in accordance with the moment direction. For example, when the moving direction of the operation object is the screen depth direction and the operation handler 14 is tilted in the upper right direction, the action may be identified as the "forward roll" or the "forward roll jump", and the screen right depth direction may be identified as the direction of the action. In another example, regardless of the moving direction of the operation object or an operation in a slide direction, the type and the direction of the action may be identified in accordance with an operation in a moment direction. Alternatively, the direction of a predetermined action may be identified in accordance with an operation in a moment direction. For example, although the operation object executes the "forward roll" action in accordance with an operation in a moment direction, the direction of the forward roll may be identified in accordance with the moment direction.

3-15. Variation 15

The controller 1 according to the first exemplary embodiment is an example of a controller capable of inputting two operations, namely an operation in a shear direction and an operation in a moment direction, via a single operation handler. Instead of the controller 1, a controller 5 described below may be employed.

Figure 17:
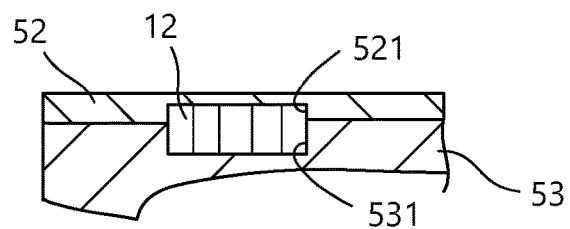
FIG. 17 is an example non-limiting side cross-sectional view showing a force receiving member 52, the sensor device 12, and a sensor fixing member 53.

A controller 5 includes a housing 51, a force receiving member 52, the sensor device 12, and a sensor fixing member 53. FIG. 17 is a side cross-sectional view particularly showing the force receiving member 52, the sensor device 12, and the sensor fixing member 53 among these components included in the controller 5.

Although not shown in the figures, the housing 51 has a roughly reverse U-shape. More specifically, the housing 51 is composed of an approximately cuboid housing main body and a left holding portion and a right holding portion, each of which has an approximately rod shape. The left holding portion is linked to the left bottom surface of the housing main body through the force receiving member 52, the sensor device 12, and the sensor fixing member 53. The right holding portion is directly linked to the right bottom surface of the housing main body. The left holding portion is held by the left hand of the user, and the right holding portion is held by the right hand of the user. That is, the controller 5 is a controller of a type held by both hands of the user.

Next, the force receiving member 52 is an approximately circular plate-like member. The force receiving member 52 includes an approximately circular recessed portion 521 at the center of the bottom surface of the force receiving member 52. The upper surface of the force receiving member 52 is fixed to the left bottom surface of the housing main body.

As described in the first exemplary embodiment, the sensor device 12 is a six-axis force sensor for detecting an operation of the user. In the exemplary embodiment, the upper surface of the sensor device 12 is fixed to the bottom surface of the recessed portion 521 of the force receiving member 52.

The sensor fixing member 53 is an approximately circular plate-like member. The sensor fixing member 53 includes an approximately circular recessed portion 531 at the center of the upper surface of the sensor fixing member 53. The bottom surface of the sensor device 12 is fixed to the bottom surface of the recessed portion 531. Additionally, the left holding portion is fixed to the bottom surface of the sensor fixing member 53.

The recessed portion 531 of the sensor fixing member 53 and the recessed portion 521 of the above force receiving member 52 are set to a depth at which the sensor fixing member 53 and the force receiving member 52 do not come into contact with each other when the sensor fixing member 53 and the force receiving member 52 sandwich the sensor device 12. This is to make the left holding portion movable relative to the housing main body. The left holding portion thus made movable is an operation handler that is operated by being sandwiched between the left palm and the fingers other than the thumb of the user. Similarly to the operation handler 14 according to the first exemplary embodiment, two operations, namely an operation in a shear direction and an operation in a moment direction, can be input also via the left holding portion.

3-16. Variation 16

In the above first exemplary embodiment, the controller 1 and the information processing apparatus 2 may perform wired communication with each other. Similarly, in the above second exemplary embodiment, the controllers 6 and the main body apparatus 7 may perform wired communication with each other.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system, comprising:
    a controller comprising:
        an operation handler operable by a finger of a user; and
        one or more sensors, and
    one or more processors configured to at least:
        based on output from the one or more sensors, determine a shear parameter including shear direction components in at least two directions and a moment parameter including moment direction components with respect to at least two axes, the shear parameter and the moment parameter relating to a user operation on the operation handler detected by the one or more sensors; and
        based on a first input that is one of the shear parameter and the moment parameter, execute a first control that is control of a movement or an orientation of an operation object in a virtual space operated by the user, and based on a second input that is the other of the shear parameter and the moment parameter, execute a second control that is control different from the control of either the movement or the orientation of the operation object,
    wherein in a case where the second control is executed based on the second input when the first input is provided, the second control of a different type is executed based on the first input.

2. The information processing system according to claim 1, wherein the second control is control for causing the operation object to execute a predetermined action.

3. The information processing system according to claim 1, wherein the second control is control of a movement or an orientation of a virtual camera relating to a first-person viewpoint or a third-person viewpoint of the operation object.

4. The information processing system according to claim 1, wherein one of the first control and the second control is stepwise control according to an input amount of one of the first input and the second input, the other control is stepwise control according to an input amount of the other input, and one of the first control and the second control has steps finer than the other.

5. The information processing system according to claim 1, wherein an input amount of one of the first input and the second input required to execute one of the first control and the second control is greater than the other input amount required to execute the other control.

6. The information processing system according to claim 1, wherein when one of the first control and the second control is executed based on one of the first input and the second input, the other input amount required to execute the other control is greater than when both types of control are not executed.

7. The information processing system according to claim 1, wherein when one of the first input and the second input is provided, an input amount required to execute control based on the other input is greater than an input amount required to execute control based on the other input when the one input is not provided.

8. The information processing system according to claim 1, wherein:
    the second control is configured to cause the operation object to execute a predetermined action, and actions of different types are executed based on the first input and a direction of the second input.

9. The information processing system according to claim 1, wherein:
the second control is configured to cause the operation object to execute a predetermined action, and
actions in different directions are executed based on the first input and a direction of the second input.

10. The information processing system according to claim 1, wherein the shear parameter and the moment parameter are parameters relating to a displacement of the operation handler or a force applied to the operation handler by the user.

11. The information processing system according to claim 1, wherein
in accordance with the first input or the first control executed based on the first input, a type of the second control or execution of the second control is determined.

12. An information processing system, comprising:
a controller comprising:
an operation handler operable by a finger of a user; and
one or more sensors, and
one or more processors configured to at least:
based on output from the one or more sensors, determine a shear parameter including shear direction components in at least two directions and a moment parameter including moment direction components with respect to at least two axes, the shear parameter and the moment parameter relating to a user operation on the operation handler detected by the one or more sensors;
based on a first input that is one of the shear parameter and the moment parameter, execute a first control that is control of a movement or an orientation of an operation object in a virtual space operated by the user, and based on a second input that is the other of the shear parameter and the moment parameter, execute a second control that is control different from the control of either the movement or the orientation of the operation object; and
switch an operation mode between a first operation mode configured to execute both the first control and the second control, and a second operation mode configured to execute one of the first control and the second control.

13. The information processing system according to claim 12, wherein in the second operation mode, the first control or the second control is executed based on an input amount of the first input and an input amount of the second input.

14. The information processing system according to claim 12, wherein:
the controller further comprises:
another operation handler operable by a finger different from the finger of the user; and
another sensor, and
the one or more processors are further to configured to at least:
based on output from the other sensor, determine another shear parameter including shear direction components in at least two directions and another moment parameter including moment direction components with respect to at least two axes, the other shear parameter and the other moment parameter relating to another user operation on the other operation handler detected by the other sensor; and
in the second operation mode, in a case where the movement or the orientation of the operation object is controlled based on the shear parameter, execute a control different from the control of the movement or the orientation of the operation object based on the other moment parameter, and in a case where control different from the control of the movement or the orientation of the operation object is executed based on the moment parameter, control the movement or the orientation of the operation object based on the other shear parameter.

15. The information processing system according to claim 12, further comprising:
another controller comprising:
another operation handler operable by a finger different from the finger of the user; and
another sensor, wherein the one or more processors are further to configured to at least:
based on output from the other sensor, determine another shear parameter including shear direction components in at least two directions and another moment parameter including moment direction components with respect to at least two axes, the other shear parameter and the other moment parameter relating to another user operation on the other operation handler detected by the other sensor; and
in the second operation mode, in a case where the movement or the orientation of the operation object is controlled based on the shear parameter, execute a control different from the control of the movement or the orientation of the operation object based on the other moment parameter, and in a case where control different from the control of the movement or the orientation of the operation object is executed based on the moment parameter, control the movement or the orientation of the operation object based on the other shear parameter.

16. A non-transitory computer-readable storage medium having stored therein an information processing program that, when executed, causes a computer of an information processing apparatus to perform operations comprising:
acquiring a shear parameter including shear direction components in at least two directions and a moment parameter including moment direction components with respect to at least two axes, the shear parameter and the moment parameter relating to a user operation on an operation handler of a controller in communication with the information processing apparatus, the operation handler being operable by a finger of a user, the user operation being detected by one or more sensors of the controller; and
based on a first input that is one of the shear parameter and the moment parameter, executing a first control that is control of a movement or an orientation of an operation object in a virtual space operated by the user, and based on a second input that is the other of the shear parameter and the moment parameter, executing a second control that is a control different from the control of either the movement or the orientation of the operation object,
wherein in a case where the second control is executed based on the second input when the first input is provided, the second control of a different type is executed based on the first input.

17. The non-transitory computer-readable storage medium according to claim 16, wherein:

the second control is configured to cause the operation object to execute a predetermined action, and actions of different types are executed based on the first input and a direction of the second input.

18. An information processing method executed in connection with an information processing system including a controller, the controller comprising an operation handler operable by a finger of a user, the method comprising:

based on output from one or more sensors of the controller, determining a shear parameter including shear direction components in at least two directions and a moment parameter including moment direction components with respect to at least two axes, the shear parameter and the moment parameter relating to a user operation on the operation handler detected by the one or more sensors; and based on a first input that is one of the shear parameter and the moment parameter, executing a first control that is control of a movement or an orientation of an operation object in a virtual space operated by the user, and based on a second input that is the other of the shear parameter and the moment parameter, executing a second control that is control different from the control of either the movement or the orientation of the operation object, wherein in a case where the second control is executed based on the second input when the first input is provided, the second control of a different type is executed based on the first input.

19. An information processing system, comprising:

a controller comprising:
  a first operation handler operable by a finger of a user and a second operation handler operable by another finger of the user; and
  one or more sensors configured to detect user operations on each of the first and second operation handlers, and one or more processors configured to at least:
  based on output from the one or more sensors, determine a first slide component and a first tilt component of the user operation on the first operation handler and a second slide component and a second tilt component of the user operation on the second operation handler; and
  based on the first slide component, control a movement of a first operation object in a virtual space, and based on the first tilt component, control an orientation of the first operation object, and based on the second slide component, control a movement of a second operation object in the virtual space, and based on the second tilt component, control an orientation of the second operation object.

20. The information processing system according to claim 19, wherein the first operation object is an object of a predetermined part of a predetermined virtual character in the virtual space, and the second operation object is an object of another part of the virtual character.

21. A non-transitory computer-readable storage medium having stored therein an information processing program that, when executed, causes a computer of an information processing apparatus to perform operations comprising:

acquiring a shear parameter including shear direction components in at least two directions and a moment parameter including moment direction components with respect to at least two axes, the shear parameter and the moment parameter relating to a user operation on an operation handler of a controller in communication with the information processing apparatus, the operation handler being operable by a finger of a user, the user operation being detected by one or more sensors of the controller;

based on a first input that is one of the shear parameter and the moment parameter, executing a first control that is control of a movement or an orientation of an operation object in a virtual space operated by the user, and based on a second input that is the other of the shear parameter and the moment parameter, executing a second control that is a control different from the control of either the movement or the orientation of the operation object; and switching an operation mode between a first operation mode configured to execute both the first control and the second control, and a second operation mode configured to execute one of the first control and the second control.

22. A non-transitory computer-readable storage medium having stored therein an information processing program that, when executed, causes a computer of an information processing apparatus to perform operations, the information processing apparatus being in communication with a controller comprising a first operation handler operable by a finger of a user and a second operation handler operable by another finger of the user, the controller further comprising one or more sensors configured to detect user operations on each of the first and second operation handlers, the operations comprising:

based on output from the one or more sensors, determining a first slide component and a first tilt component of the user operation on the first operation handler and a second slide component and a second tilt component of the user operation on the second operation handler; and based on the first slide component, controlling a movement of a first operation object in a virtual space, and based on the first tilt component, controlling an orientation of the first operation object, and based on the second slide component, controlling a movement of a second operation object in the virtual space, and based on the second tilt component, controlling an orientation of the second operation object.

23. The non-transitory computer-readable storage medium according to claim 22, wherein the first operation object is an object of a predetermined part of a predetermined virtual character in the virtual space, and the second operation object is an object of another part of the virtual character.

* * * * *